US010240659B2

(12) United States Patent
Nakashima et al.

(10) Patent No.: US 10,240,659 B2
(45) Date of Patent: Mar. 26, 2019

(54) CONTROL DEVICE OF A POWERTRAIN WITH A CENTRIFUGAL PENDULUM DAMPER

(71) Applicant: Mazda Motor Corporation, Aki-gun, Hiroshima (JP)

(72) Inventors: Kyosei Nakashima, Hiroshima (JP); Yasunari Nakayama, Kure (JP); Tadashi Saito, Hiroshima (JP); Masaru Nakagishi, Hiroshima (JP); Narifumi Domen, Aki-gun (JP); Narihito Hongawara, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 329 days.

(21) Appl. No.: 15/368,086

(22) Filed: Dec. 2, 2016

(65) Prior Publication Data

US 2017/0159747 A1 Jun. 8, 2017

(30) Foreign Application Priority Data

Dec. 7, 2015 (JP) ................................ 2015-238868

(51) Int. Cl.
*F16D 48/06* (2006.01)
*F16F 15/14* (2006.01)
*F16F 15/00* (2006.01)

(52) U.S. Cl.
CPC ............ *F16F 15/145* (2013.01); *F16D 48/06* (2013.01); *F16F 15/002* (2013.01); *F16D 2300/22* (2013.01); *F16D 2500/1045* (2013.01); *F16D 2500/10412* (2013.01); *F16D 2500/306* (2013.01); *F16D 2500/30401* (2013.01); *F16D 2500/316* (2013.01)

(58) Field of Classification Search
None
See application file for complete search history.

(56) References Cited

U.S. PATENT DOCUMENTS 9,791,043 B2 * 10/2017 Nakashima ......... F16F 15/1478
2014/0366682 A1 12/2014 Murata

FOREIGN PATENT DOCUMENTS

JP H10184799 A 7/1998
JP 2013092183 A 5/2013
JP 2014228009 A 12/2014

* cited by examiner

*Primary Examiner* — Jacob S. Scott
(74) *Attorney, Agent, or Firm* — Alleman Hall Creasman & Tuttle LLP

(57) ABSTRACT

A control device of a powertrain with a centrifugal pendulum damper is provided in which the centrifugal pendulum damper and a power transmission shaft are operatively coupled via a connection/disconnection mechanism, and the control device of the powertrain with the centrifugal pendulum damper includes a connection/disconnection control module for controlling an engagement degree of the connection/disconnection mechanism by controlling the engagement degree of the connection/disconnection mechanism such that the centrifugal pendulum damper rotates at or below a predetermined upper rotational speed limit.

20 Claims, 6 Drawing Sheets

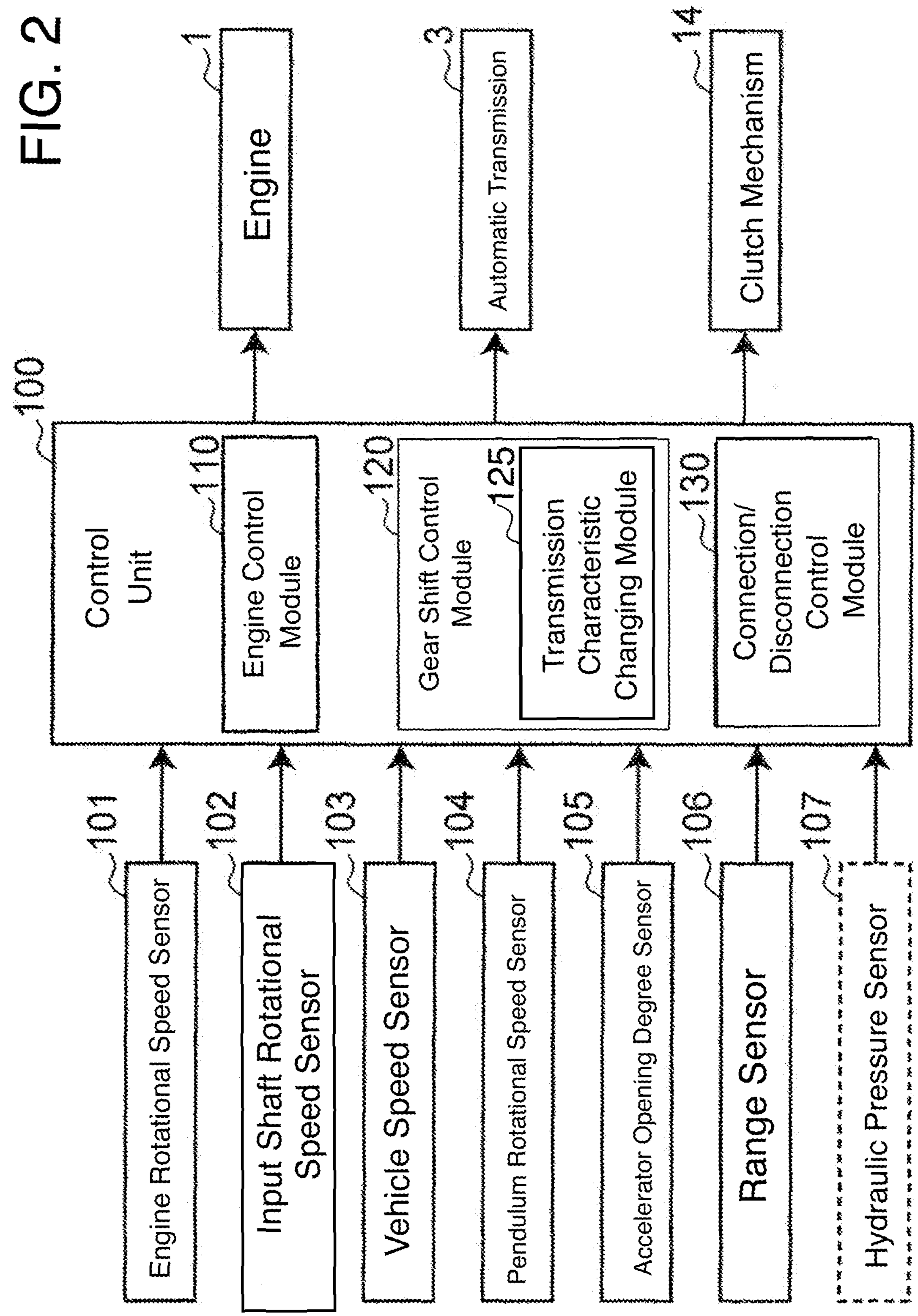
FIG. 2
Engine Rotational Speed Sensor
101
Input Shaft Rotational Speed Sensor
102
Vehicle Speed Sensor
103
Pendulum Rotational Speed Sensor
104
Accelerator Opening Degree Sensor
105
Range Sensor
106
Hydraulic Pressure Sensor
107
Control Unit
100
Engine Control Module
110
Gear Shift Control Module
120
Transmission Characteristic Changing Module
125
Connection/ Disconnection Control Module
130
Engine
1
Automatic Transmission
3
Clutch Mechanism
14

CONTROL DEVICE OF A POWERTRAIN WITH A CENTRIFUGAL PENDULUM DAMPER

BACKGROUND

The present invention relates to a control device of a powertrain of a vehicle or the like, particularly to a control device of a powertrain with a centrifugal pendulum damper.

Conventionally, the use of an engine cylinder cut-off operation and homogenous charge-compression ignition (HCCI) combustion, and furthermore, of an art such as making an automatic transmission torque converter-less by eliminating the torque converter, are known for increasing fuel efficiency of a vehicle equipped with a powertrain comprising a power transmission path which extends from an engine to a drive wheel via an automatic transmission.

However, there is a tendency for output torque fluctuations to become larger in an engine which has adopted a cylinder cut-off operation or HCCI combustion, and also, because engine torque fluctuations are output from an automatic transmission without attenuation when the automatic transmission has been made torque converter-less, torque fluctuations transmitted to a power transmission system on an automatic transmission output side become larger in a vehicle using such an art. In particular, torsional vibrations caused by these larger torque fluctuations may become a cause of vibration or noise generation in various vehicle parts if amplified by resonance of the power transmission system.

For the sake of convenience, the term “automatic transmission” will hereinafter be described as including not only a multi-stage automatic transmission provided with a transmission mechanism for switching between gear ratios in a step-wise manner, but as also including a continuously variable automatic transmission (CVT) provided with a transmission mechanism for continuously changing gear ratios as well. Additionally, a transmission mechanism which is an automatic transmission does not include a torque converter or a torsion damping mechanism.

With respect to the above-described problem, an art is known such as, for example, operatively coupling a centrifugal pendulum damper to a power transmission shaft as disclosed in JP2014228009A. The centrifugal pendulum damper has a support member which rotates together with the power transmission shaft, and a pendulum which is a mass supported by the member so as to be able to swing centered on a circumferential point at a fixed radius from an axial center of the support member. When the pendulum swings due to torque fluctuations, a circumferentially-directed component of force is generated in the support member which receives the centrifugal force acting on the pendulum. This component of force acts as an anti-torque which suppresses torque fluctuations of the support member and the power transmission shaft.

In an engine low-speed rotation range, such as at a time of starting, the centrifugal pendulum damper coupled to the power transmission shaft also rotates at a low speed and the centrifugal force acting on the pendulum is reduced, and due to this reduced centrifugal force, a torque fluctuation suppression operation of the pendulum becomes unstable and the pendulum may cause generation of abnormal noise due to contact with a peripheral member. In the invention of JP2014228009A, a connection/disconnection mechanism for attenuating power transmission to the centrifugal pendulum damper is provided between the power transmission shaft and the centrifugal pendulum damper to suppress generation of abnormal noise. As described below, a connection/disconnection mechanism of the present invention is a frictionally-engaged type of clutch which transmits power by frictional force and which can smoothly transmit torque, even when there is a difference in rotational speeds between an input shaft and an output shaft, by shifting from a released state to a slip state or an engaged state while adjusting an engagement degree by controlling hydraulic pressure, electric current, or the like. In the present invention, “engaged” and “released” denote that the connection/disconnection mechanism as a whole is connected and cut-off, respectively, and “slipping” denotes an incomplete connection in which the connection/disconnection mechanism is slipping.

However, as in the prior art described in JP2014228009A, when the connection/disconnection mechanism is disposed between the power transmission shaft and the centrifugal pendulum damper, and a connected state of the connection/disconnection mechanism is maintained even during an engine high-speed rotation range in order to suppress torque fluctuations, a rotational speed of the centrifugal pendulum damper connected via the connection/disconnection mechanism is also increased, and there is a possibility that over-rotation may degrade reliability of the centrifugal pendulum damper due to over-rotation of the damper.

SUMMARY

The present invention was made in view of the above-described problem related to a power transmission device with a centrifugal pendulum damper and aims to avoid a reduction in reliability of the centrifugal pendulum damper due to high speed rotation of the damper.

In order to solve the aforementioned problem, a control device for a powertrain with a centrifugal pendulum damper according to the present invention has characteristics of being configured as follows.

According to one aspect of the present invention, a control device for a powertrain with a centrifugal pendulum damper is provided in which the centrifugal pendulum damper and a power transmission shaft are operatively coupled via a connection/disconnection mechanism. The control device comprises a connection/disconnection control module operatively coupled to the connection/disconnection mechanism and configured to control an engagement degree of the connection/disconnection mechanism. The connection/disconnection control module controls the engagement degree of the connection/disconnection mechanism such that the centrifugal pendulum damper rotates at or below a first predetermined upper rotational speed limit.

With the above configuration, a differential rotation of a rotational speed of the centrifugal pendulum damper with respect to a rotational speed of the power transmission shaft is changed due to a change in a transmission rate of torque transmitted to the centrifugal pendulum damper from the power transmission shaft according to the engagement degree of the connection/disconnection mechanism, and therefore, the rotational speed of the centrifugal pendulum damper may be controlled by controlling the engagement degree of the connection/disconnection mechanism.

Consequently, since the connection/disconnection control module controls the engagement degree of the connection/disconnection mechanism to cause the centrifugal pendulum damper to rotate at or below the predetermined upper rotational speed limit according to the invention as described above, by setting a rotational speed of the predetermined upper rotational speed limit to be a rate at which the centrifugal pendulum damper can rotate without being reduced in reliability, a reduction in the reliability of the centrifugal pendulum damper due to high speed rotation may be avoided.

Further, the power transmission shaft and the centrifugal pendulum damper may be operatively coupled via a speed increasing mechanism.

With the above configuration, because the power transmission shaft and the centrifugal pendulum damper are operatively coupled via the speed increasing mechanism, the rotational speed of the centrifugal pendulum damper increases with respect to the power transmission shaft, and centrifugal force for acting upon the pendulum may be secured even if a weight and a rotational radius of a pendulum of the centrifugal pendulum damper are reduced. The centrifugal pendulum damper may thus be reduced in size while sufficiently suppressing vibrations.

Further, the predetermined upper rotational speed limit may be set according to a load of a power source.

With the above configuration, the predetermined upper rotational speed limit is set according to the load of the power source according to the above configuration and, for example, by lowering the predetermined upper rotational speed limit within a range in which the load of the power source is relatively large wherein torque fluctuations are not easily generated, a region of the engaged state in which a cylinder cut-off operation or the like is performed may be secured while avoiding a reduction in the reliability of the centrifugal pendulum damper due to high speed rotation, and as a result, the fuel efficiency of the engine may be increased.

Further, when a rotational speed of the centrifugal pendulum damper has increased to the first predetermined upper rotational speed limit, the connection/disconnection control module may control the engagement degree of the connection/disconnection mechanism to a released side to cause the rotational speed of the centrifugal pendulum damper to be at or below the first predetermined upper rotational speed limit.

With the above configuration, the connection/disconnection control module controls the engagement degree of the connection/disconnection mechanism to the released side to cause the rotational speed to be at or below the predetermined upper rotational speed limit when the rotational speed of the centrifugal pendulum damper has increased to the predetermined upper rotational speed limit, and consequently, the connection/disconnection mechanism can maintain the engaged state until the rotational speed of the centrifugal pendulum damper is at the predetermined upper rotational speed limit, and the vibration suppression effects of the centrifugal pendulum damper can be obtained in as wide of an engine rotational range as possible. As a result, a wide engine operation range in which a cylinder cut-off operation or the like is possible may be secured while avoiding a reduction in the reliability of the centrifugal pendulum damper due to high speed rotation.

Further, when a rotational speed of the centrifugal pendulum damper has increased to a second predetermined upper rotational speed limit which is lower than the first predetermined upper rotational speed limit, the connection/disconnection control module may control the engagement degree of the connection/disconnection mechanism to a released side.

With the above configuration, the connection/disconnection control module controls the engagement degree of the connection/disconnection mechanism to the released state at the time when the rotational speed of the centrifugal pendulum damper has increased to the second predetermined upper rotational speed limit which is lower than the first predetermined upper rotational speed limit, the engine rotational speed is thus restrained from exceeding the predetermined upper rotational speed limit even when a time delay occurs before the connection/disconnection mechanism is actually switched to a released state, and as a result, a reduction in the reliability of the centrifugal pendulum damper due to high speed rotation can even more surely be avoided.

Further, a control of the connection/disconnection mechanism to the released side by the connection/disconnection control module may include a control for releasing the connection/disconnection mechanism and a control for slipping the connection/disconnection mechanism.

With the above configuration, since the control of the connection/disconnection processor to the released side by the connection/disconnection control module includes the control for releasing the connection/disconnection mechanism, and the control for slipping the connection/disconnection mechanism, the connection/disconnection mechanism may be smoothly switched from the engaged state to the released state via the slip state by gradually decreasing the engagement degree of the connection/disconnection mechanism. The occurrence of a shock due to a rapid change in the engagement degree may thus be prevented.

BRIEF DESCRIPTION OF THE DRAWINGS

FIG. 2 is a diagram of a control system of the powertrain.

DETAILED DESCRIPTION OF THE EMBODIMENT

An embodiment of the present invention is described below.

Figure 1:
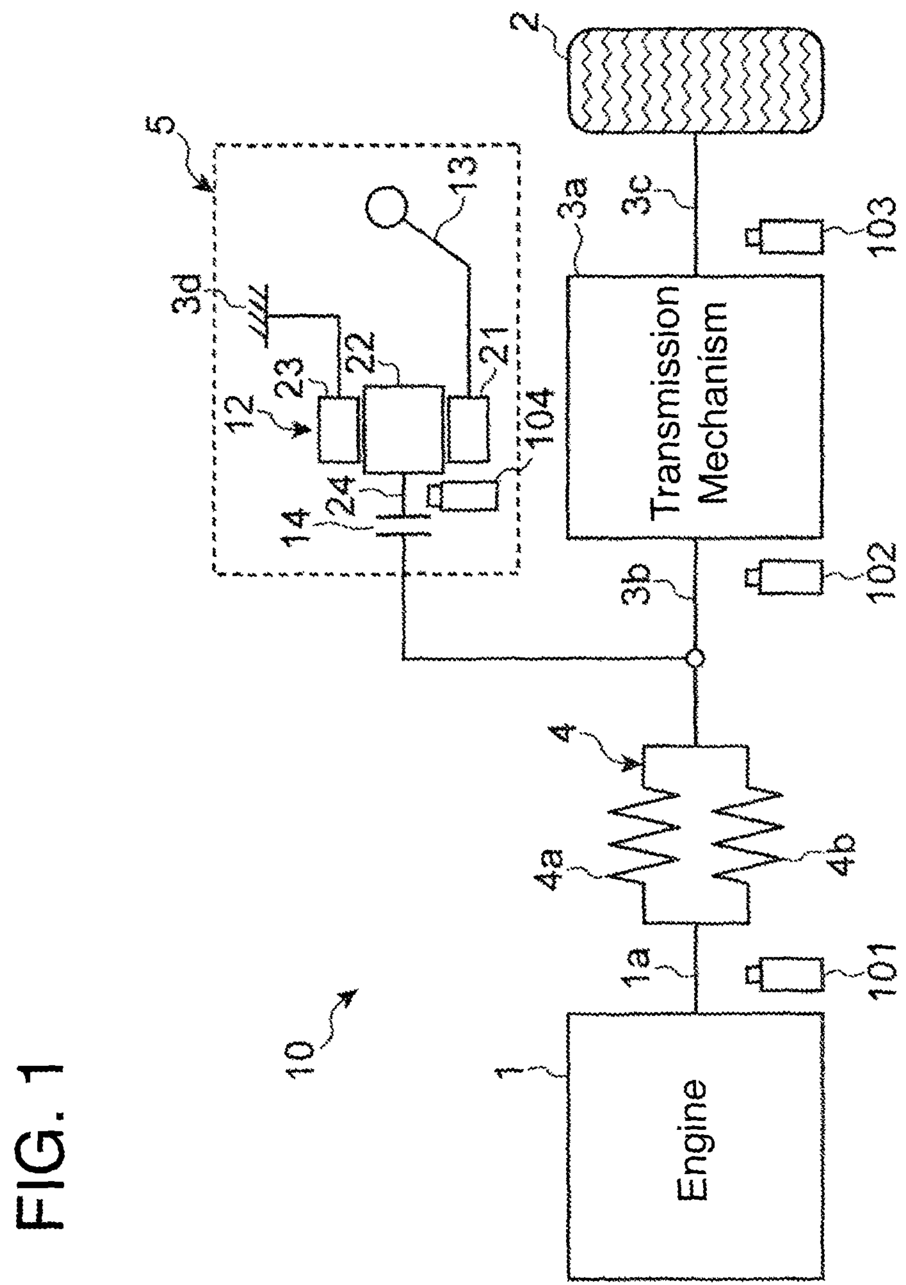
FIG. 1 is a skeleton diagram illustrating a powertrain with a centrifugal pendulum damper according to an embodiment of the present invention.

FIG. 1 is a skeleton diagram showing a configuration of a powertrain with a centrifugal pendulum damper (referred to hereinafter as "the powertrain 10") according to an embodiment of the present invention. As shown in FIG. 1, the powertrain 10 provides an automatic transmission 3 with a transmission mechanism 3*a* for transmitting a drive force of an engine 1 to a drive wheel 2, a torsion damping mechanism 4 coupling to an output shaft 1*a* of the engine 1 and an input shaft 3*b* of transmission mechanism 3*a*, and a centrifugal pendulum damper mechanism 5 coupled to the input shaft 3*b* of the transmission mechanism 3*a*.

The automatic transmission 3 is a multi-stage automatic transmission provided with the transmission mechanism 3*a* which switches gear ratios in a step-wise manner by selectively engaging one or more of a plurality of friction fastening elements. Note that the automatic transmission 3 may be a continuously variable automatic transmission (CVT) provided with a transmission mechanism which continuously changes gear ratios. Additionally, a torque converter may be provided instead of the torsion damping mechanism 4.

The torsion damping mechanism 4 provides a first spring member 4*a* and a second spring member 4*b* which are disposed in parallel with each other, and between and in series with the aforementioned output shaft 1*a* and the input shaft 3*b*. As a result, rotations of the output shaft la are transmitted to an input shaft 3*b* side via the spring members 4*a* and 4*b*. Note that the "input shaft 3*b*" in the present embodiment corresponds to the "power transmission shaft".

The centrifugal pendulum damper mechanism 5 provides a planetary gear set 12 which is a speed increasing mechanism for increasing a rotational speed of the input shaft 3*b*, a centrifugal pendulum damper 13 which is coupled to the input shaft 3*b* via the planetary gear set 12, and a clutch mechanism 14 which is a connection/disconnection mechanism which can cut-off or connect the power transmitted from the input shaft 3*b* to the planetary gear set 12. Note that the clutch mechanism 14 may be disposed between the planetary gear set 12 and the centrifugal pendulum damper 13.

The planetary gear set 12 is a single-pinion type and has, as rotational elements, a sun gear 21, a ring gear 23, and a pinion carrier 24 (hereinafter abbreviated as simply the "carrier 24") supporting a pinion 22 which meshes gears with the sun gear 21 and the ring gear 23.

And the centrifugal pendulum damper 13 is communicated to the sun gear 21 as the input shaft 3*b* is coupled to the carrier 24 of the planetary gear set 12 via the clutch mechanism 14. Also, the ring gear 23 is restrained from rotating by being coupled to a transmission case 3*d*.

The centrifugal pendulum damper 13 provides a supporting member coupled to the sun gear 21 of the planetary gear set 12, and a pendulum which is a mass supported by the supporting member to be able to swing centered on a circumferential point at a fixed radius from an axial center of the member. The centrifugal pendulum damper 13 is configured such that when the pendulum swings due to torque fluctuations, a circumferentially-directed component of force is generated in the support member receiving the centrifugal force acting on the pendulum, and torsional vibration of the input shaft 3*b* can be absorbed as a result of this component of force acting as an anti-torque which suppresses the torque fluctuations of the member.

The clutch mechanism 14 provides a plurality of friction plates which can be engaged to each other and a hydraulic actuator which engages the friction plates by pressurization, and is configured such that by controlling the hydraulic pressure supplied to the actuator, the engagement degree may be changed, that is, the clutch mechanism 14 may be switched to an engaged, released, or slip state.

Operations of the above-described powertrain 10 will now be explained.

First, when the engine 1 is activated, the engine's power is transmitted to the torsion damping mechanism 4 by which torque fluctuations of the engine 1 are absorbed to some extent. A portion of the power transmitted to the torsion damping mechanism 4 is further transmitted via the input shaft 3*b* of the transmission mechanism 3*a* to the centrifugal pendulum damper mechanism 5. When the clutch mechanism 14 of the centrifugal pendulum damper mechanism 5 is engaged, power is transmitted from the input shaft 3*b* to the planetary gear set 12 via the clutch mechanism 14. In such a case, because the rotation of the ring gear 23 of the planetary gear set 12 is restrained by the transmission case 3*d*, the sun gear 21 rotates along with the rotation of the carrier 24 which is coupled with the input shaft 3*b*. The rotation of the sun gear 21 increases in speed, corresponding with the rotation of the carrier 24 according to a gear ratio of the sun gear 21 and the ring gear 23. The centrifugal pendulum damper 13 is driven by the increased rotational speed of the sun gear 21. In this case, the torque fluctuations which were not fully absorbed by the torsion damping mechanism 4 are absorbed by the centrifugal pendulum damper 13.

Further, the powertrain 10 in the present embodiment is provided with each of an engine rotational speed sensor 101 for detecting a rotational speed of the output shaft 1*a* of the engine 1, a transmission mechanism input shaft rotational speed sensor 102, (hereinafter referred to simply as "the input shaft rotational speed sensor 102") for detecting the rotational speed of the input shaft 3*b* of the transmission mechanism 3*a*, a vehicle speed sensor 103 for detecting a rotational speed of an output shaft 3*c* of the transmission mechanism 3*a*, and a pendulum rotational speed sensor 104 for detecting a rotational speed of the centrifugal pendulum damper 13. Magnetic sensors such as, for example, pickup coil types, hole element types, magneto-resistive element types, or the like, may be used as the rotational speed sensors 101 to 104. Note that the pendulum rotational speed sensor 104 in the present embodiment is one which indirectly detects the rotational speed of the centrifugal pendulum damper 13 based upon a rotational speed obtained by detecting a rotational speed of a rotational element on a planetary gear set 12 side of the clutch mechanism 14 which is coupled via the centrifugal pendulum damper 13 and the planetary gear set 12, with consideration given to a speed increase due to the planetary gear set 12. However, the pendulum rotational speed sensor may alternatively be a sensor which directly detects the rotational speed of the centrifugal pendulum damper. It is also possible to remove one of the engine rotational speed sensor 101 and the input shaft rotational speed sensor 102 since the engine rotational speed and transmission mechanism input rotational speed are substantially the same.

Furthermore, the powertrain 10 configured according to the above description is provided with a control unit 100 (not shown in FIG. 1) which comprehensively controls structures related to the powertrain 10 such as the engine 1, the automatic transmission 3, and the clutch mechanism 14 of the centrifugal pendulum damper mechanism 5. The control unit 100 is configured with a microprocessor as a main part.

Next, a control system of the powertrain comprised of the control unit 100 is described with reference to FIG. 2.

FIG. 2 is a diagram of a control system of the powertrain 10. As shown in FIG. 2, the control unit 100 is configured such that signals from the engine rotational speed sensor 101, the input shaft rotational speed sensor 102, the vehicle speed sensor 103, the pendulum rotational speed sensor 104, an accelerator opening degree sensor 105 for detecting an accelerator opening degree which indicates a load of the engine 1, a range sensor 106 for detecting an operation position of a shift lever, or the like, are input thereto. A hydraulic pressure sensor 107 for detecting a control hydraulic pressure supplied to the clutch mechanism 14 may be provided as an alternative to, or in addition to, the pendulum rotational speed sensor 104.

Further, the control unit 100 is provided with an engine control module 110 which outputs control signals to the engine 1 based on input signals from the various above-described sensors or the like, a gear shift control module 120 which outputs a control signal to the automatic transmission 3 to change a gear ratio based on a gear shift command, and a connection/disconnection control module 130 which outputs a control signal for controlling the engagement degree of the clutch mechanism based on a connection or disconnection command. The gear shift control module 120 is provided with a transmission characteristic changing module 125 for changing a control characteristic of transmission hydraulic pressure supplied to the transmission mechanism 3*a* based on an engagement degree of the clutch mechanism 14 during a gear shift control. It will be understood that modules provided in the control unit 100 are software or firmware stored in non-volatile memory of the control unit 100 and configured to be executed by one or more processors of the control unit. Further, certain functional aspects of the modules may be implemented in hardware as application specific integrated circuit (ASIC), for example.

The engine control module 110 can perform a fuel injection control and an ignition control of the engine 1. The engine control module 110 may also perform a cylinder number control or the like.

The gear shift control module 120 performs a gear shift control of changing the gear range (gear ratio) based on input signals from the vehicle speed sensor 103, the accelerator opening degree sensor 105, the range sensor 106, and the like. That is, the gear shift control module 120 outputs a gear shift command to shift to a desired gear range determined from the current vehicle speed and the accelerator opening degree according to a gear shift map, which is not shown, and performs a control of shifting the transmission mechanism 3*a* to the desired gear range based on the gear shift command.

The transmission characteristic changing module 125 determines the engagement degree of the clutch mechanism 14 based on input signals from the input shaft rotational speed sensor 102 and the pendulum rotational speed sensor 104, and changes control characteristics of hydraulic pressure supplied to friction fastening elements of an engaged side and a released side based on a moment of inertia of the input shaft 3*b* corresponding to the determined degree of engagement.

In the present embodiment, the engagement degree of the clutch mechanism 14 is determined by a differential rotation $\Delta N$ ($=N_1-N_2$) of the clutch mechanism 14 which is obtained from a rotational speed $N_1$ of the input shaft 3*b* detected by the input shaft rotational speed sensor 102, and a rotational speed $N_2$ of the centrifugal pendulum damper 13 (before a speed increase) detected by the pendulum rotational speed sensor 104. A moment of inertia of the centrifugal pendulum damper 13 which is added to the input shaft 3*b* in correspondence with the engagement degree can be calculated from the following equation (1), wherein $J_A$ is a single moment of inertia of the centrifugal pendulum damper 13.

$$J_A \times \left(1 - \frac{\Delta N}{N_1}\right)^2 \quad \text{(No. 1)}$$

As is apparent from the above equation (1), in a state where the clutch mechanism 14 is completely engaged, the differential rotation $\Delta N$ is zero, and the moment of inertia added to the input shaft 3*b* is a maximum value ($J_A$). And, when the clutch mechanism is in the slip state, the differential rotation $\Delta N$ is a fixed value greater than zero and lesser than $N_1$, and the moment(s) of inertia added to the input shaft 3*b* becomes a fixed value lesser than $J_A$. Furthermore, in a state in which the clutch mechanism 14 is completely released while the rotation of the centrifugal pendulum damper 13 is stopped ($N_2=0$), the differential rotation $\Delta N$ is $N_1$, and the moment of inertia added to the input shaft 3*b* is a minimum value (zero).

Note that the engagement degree of the clutch mechanism 14 may be determined based on the control hydraulic pressure of the clutch mechanism 14 detected by the hydraulic pressure sensor 107.

Figure 3:
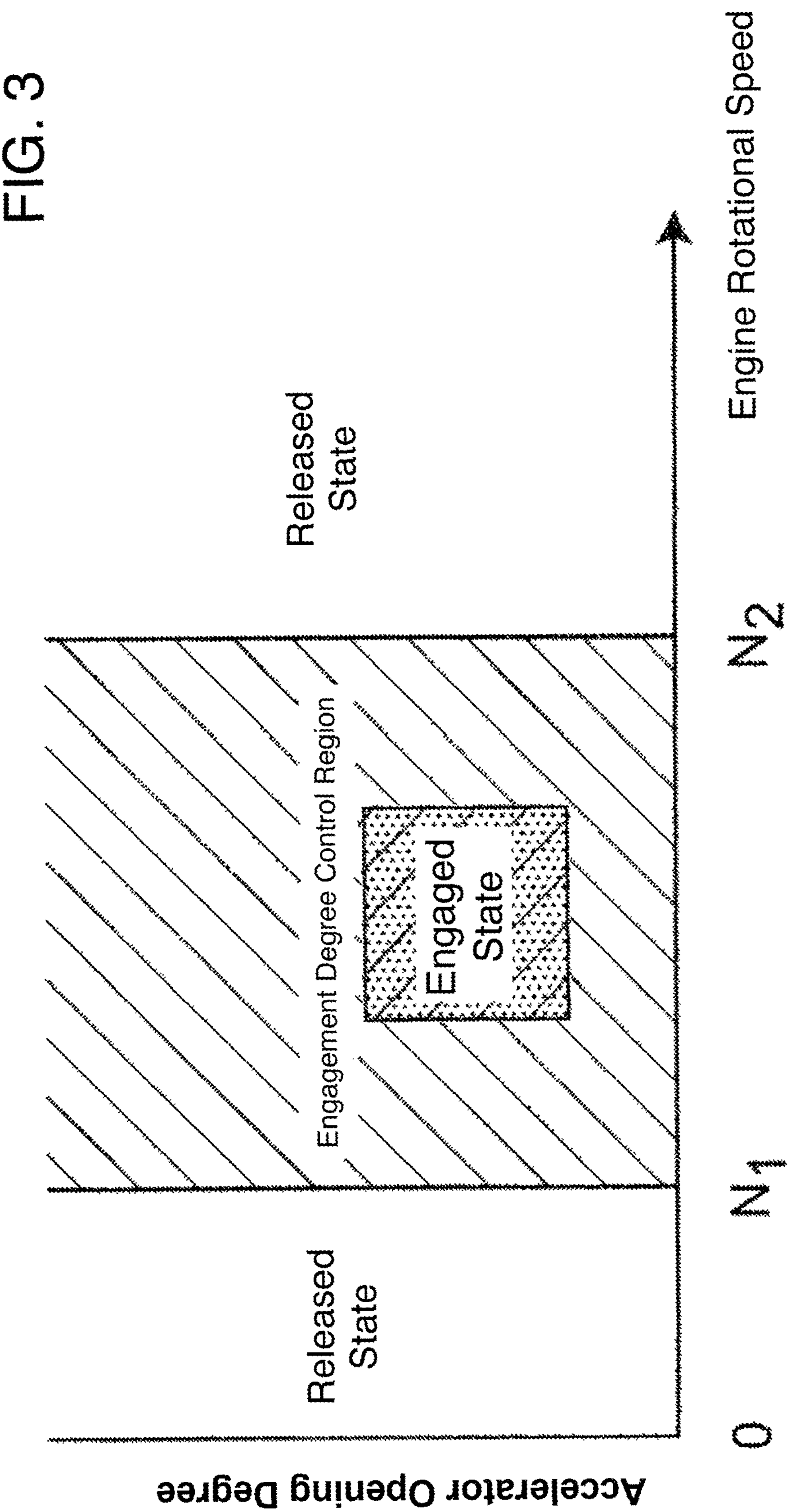
FIG. 3 is a connection/disconnection control map for a clutch mechanism of the powertrain.

The connection/disconnection control module 130 outputs a connection or disconnection command and performs a connection or disconnection control of changing the engagement degree of the clutch mechanism 14 according to the control map shown in FIG. 3, which is based on input signals from the engine rotational speed sensor 101 and the accelerator opening degree sensor 105.

That is, the connection/disconnection control module 130 performs controls on the engagement degree of the clutch mechanism 14 such that the clutch mechanism 14 is in the released state when the engine rotational speed is within a low-speed range of $N_1$ or less or in a high speed range above $N_2$ ($N_2>N_1$), and is in the engaged state or the slip state, which has a desired degree of engagement, when an engine rotational speed is within an engagement degree control region which is between $N_1$ and $N_2$.

In the present embodiment, in the above-described engagement degree control region illustrated in FIG. 3, the engagement degree of the clutch mechanism 14 is controlled to be in the engaged state in an engaged state region where there is a greater tendency to make output torque fluctuations of the engine 1, such as when a cylinder cutoff operation is performed or the accelerator opening degree is relatively small. On the other hand, the engagement degree of the clutch mechanism is controlled to be in the slipped state in areas of the engagement degree control region surrounding the engaged state region.

Further, when the engine rotational speed reaches the rotational speed $N_1$ while increasing from a low-speed range to the engagement degree control region or reaches the rotational speed $N_2$ while decreasing from a high speed range to the engagement degree control region, the connection/disconnection control module 130 makes a determination to switch the clutch mechanism 14 from the released state to the slip state which has the desired degree of engagement and, based on this determination, performs a control of changing the degree of engagement to switch the clutch mechanism 14 to the slip state.

Furthermore, when the engine rotational speed reaches the rotational speed $N_1$ while decreasing from the engagement degree control region to a low-speed range or reaches the rotational speed $N_2$ while increasing from the engagement degree control region to a high speed range, the connection/disconnection control module 130 makes a determination to switch the clutch mechanism 14 from the slip state which has the desired degree of engagement to the released state and, based on this determination, performs a control of changing the engagement degree to switch the clutch mechanism 14 to the released state.

In this case, the engine rotational speed $N_1$ is set as a rotational speed which is higher than an idling rotational speed. Also, the engine rotational speed $N_2$ is set as a rotational speed of the centrifugal pendulum damper 13 which was increased by the planetary gear set 12 to a remarkably high speed rotation such that there is a concern that the reliability of the centrifugal pendulum damper 13 may be influenced thereby.

According to the above-described connection/disconnection controls, when the engine rotational speed is in the engagement degree control region, the clutch mechanism 14 is in the slip state or the engaged state, the centrifugal pendulum damper 13 rotates together with the input shaft 3*b* and, the torsional vibration of the input shaft 3*b* is therefore absorbed by the centrifugal pendulum damper 13. The higher the engagement degree of the clutch mechanism 14 is at this time, the greater the characteristic of the centrifugal pendulum damper 13 to absorb torsional vibration is improved.

Figure 4:
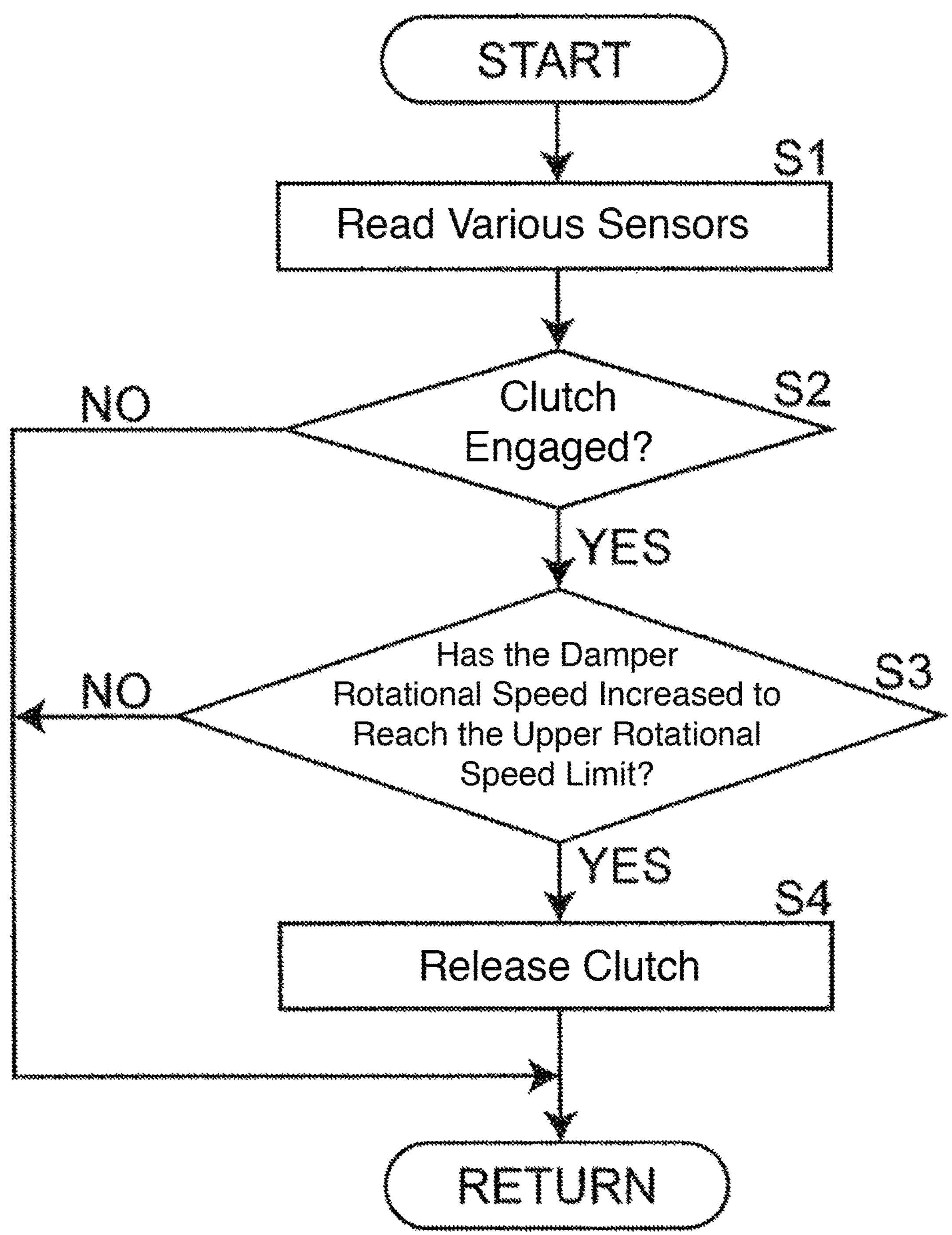
FIG. 4 is a flowchart showing a method of controlling the powertrain.

The powertrain 10 is controlled by the control unit 100 and, for example, is controlled according to the flowchart shown in FIG. 4.

First, as shown in FIG. 4, the signals output from each of the sensors are read in S1, then next, in S2, a differential rotation of the clutch mechanism 14 is detected based on output signals from the input shaft rotational speed sensor 102 and the pendulum rotational speed sensor 104, and a determination is made as to whether or not the clutch mechanism is in the slip state or the engaged state by determining the engagement degree of the clutch mechanism 14 based on the detected differential rotation.

If it is determined in S2 that the clutch mechanism 14 is in the slip state or the engaged state, then a determination is made in S3 as to whether or not the rotational speed of the centrifugal pendulum damper 13 has increased and reached an predetermined upper rotational speed limit $N_2$.

If it is determined in S3 that the rotational speed of the centrifugal pendulum damper 13 has increased and reached the predetermined upper rotational speed limit $N_2$, then next, in S4, the connection/disconnection control module 130 causes the clutch mechanism 14 to be in the released state.

On the one hand, when the clutch mechanism 14 is determined to not be in the slip state or the engaged state in S2, that is, when the clutch mechanism 14 is determined to be in the released state, the flow returns to S1. Further, in S3, when the rotational speed of the centrifugal pendulum damper 13 has increased and has not reached the predetermined upper rotational speed limit $N_2$, that is, when the rotational speed of the centrifugal pendulum damper 13 has increased and is less than the predetermined upper rotational speed limit $N_2$, or when the rotational speed decreases and is determined to have reached the predetermined upper rotational speed limit $N_2$, the flow returns to S1.

Figure 5:
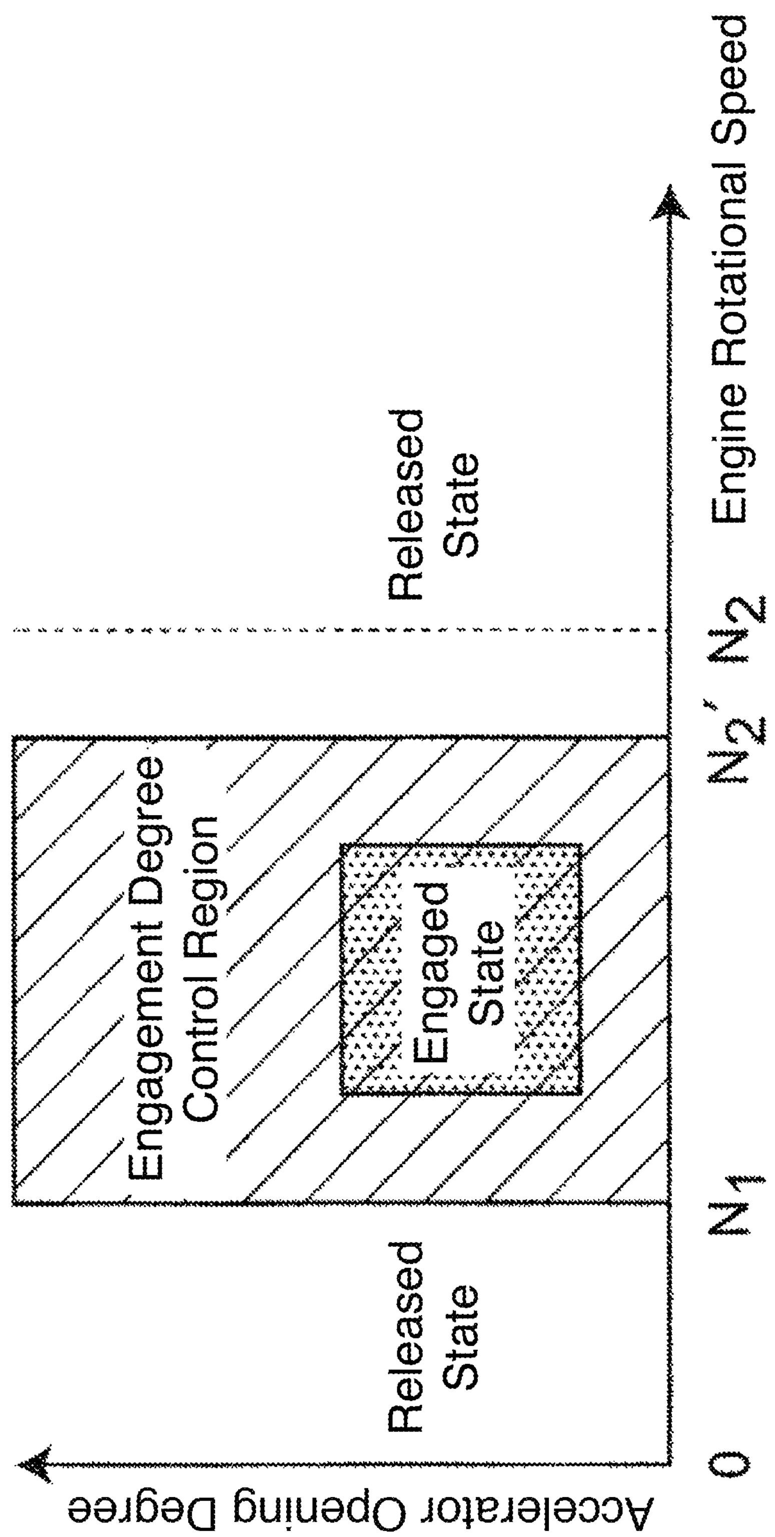
FIG. 5 is a first modification example of the connection/disconnection control map for a clutch mechanism of the powertrain.

Note that the connection/disconnection control module 130 may output a connection/disconnection command according to the first modification example control map shown in FIG. 5, and perform a connection/disconnection control to change the engagement degree of the clutch mechanism 14.

In this case, an engagement degree control region as shown in FIG. 5 differs from that shown in the control map of FIG. 3 in that the region is from the engine rotational speed $N_1$ to a predetermined rotational speed $N_2'$, which is on a lower speed side of the predetermined upper rotational speed limit $N_2$ where there is a concern that high speed rotation of the centrifugal pendulum damper 13 may influence the reliability of the damper.

According to the above, during an increase of the engine rotational speed, by quickly controlling the clutch mechanism 14 to switch from the slip state to the released state when the rotational speed of the centrifugal pendulum damper 13 rises to $N_2'$ (a second predetermined upper rotational speed limit) which is lower than the predetermined upper rotational speed limit $N_2$, the engine rotational speed can be prevented from exceeding the predetermined upper rotational speed limit $N_2$ even if a time delay occurs before the clutch mechanism is actually switched to the released state, and thus, a reduction in the reliability of the centrifugal pendulum damper due to high speed rotation can be more surely avoided.

Figure 6:
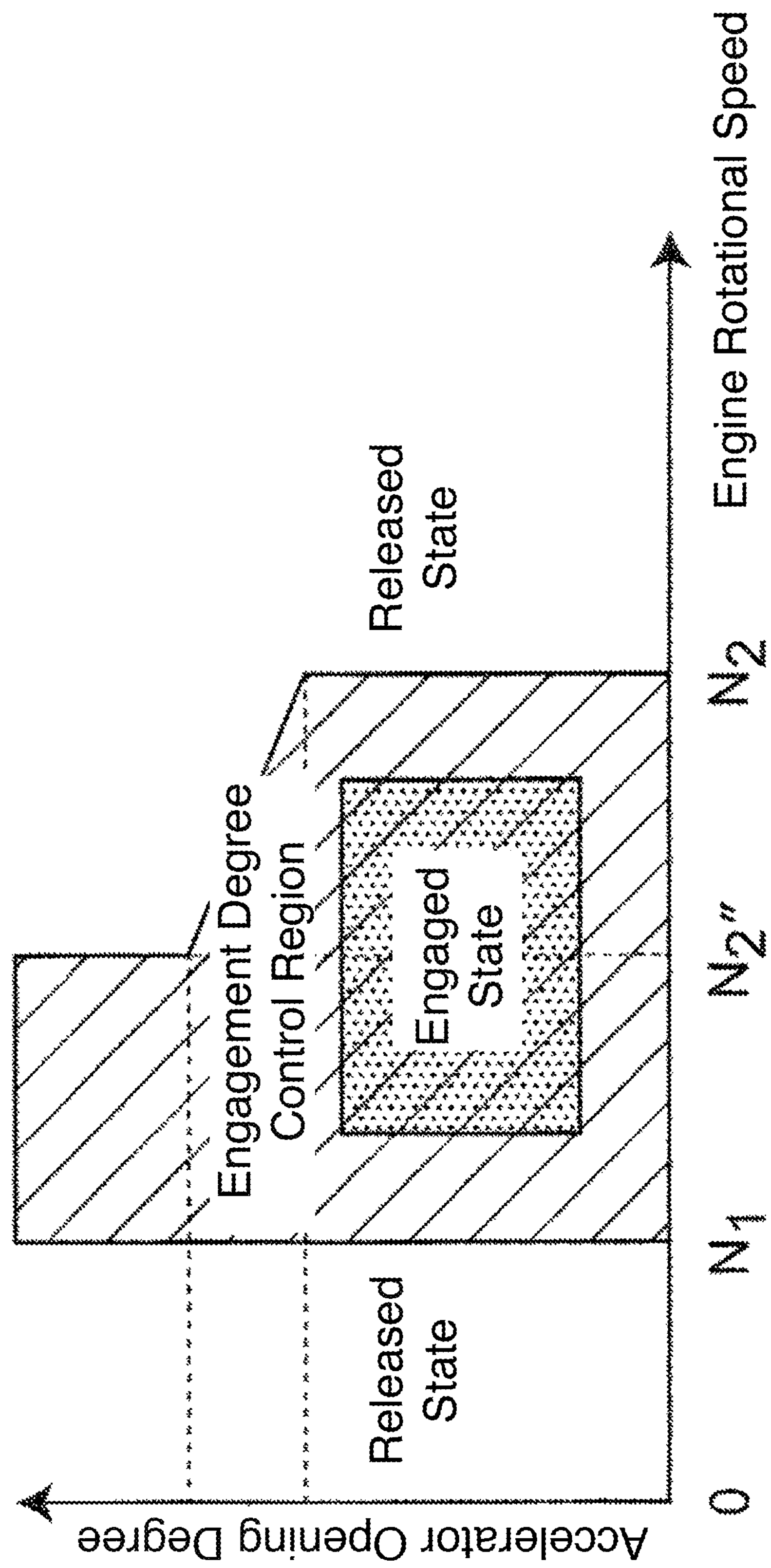
FIG. 6 is a second modification example of the connection/disconnection control map for a clutch mechanism of the powertrain.

Further, the connection/disconnection control module 130 may also output a connection/disconnection command according to the second modification control map shown in FIG. 6, and perform a connection/disconnection control to change the engagement degree of the clutch mechanism 14.

In this case, as shown in FIG. 6, an engagement degree control region differs from that shown in FIG. 3 in that a range of the engine rotational speeds is set in correspondence with accelerator opening degrees, and specifically, within a range of relatively large accelerator opening degrees, the region is narrow from the engine rotational speed $N_1$ to a predetermined rotational speed $N_2''$ which is lower than the predetermined upper rotational speed limit $N_2$ at which there is a concern that high speed rotation of the accelerated centrifugal pendulum damper 13 may influence the reliability of the damper.

Therefore, while the engine rotational speed is rising, the clutch mechanism 14 switches to the released state at the point in time when the engine rotational speed reaches the rotational speed $N_2''$ which is lower than the predetermined upper rotational speed limit $N_2$, within the range of relatively large accelerator opening degrees in which cylinder cut-off operations and the like are not performed, and also switches to the released state when the engine reaches the predetermined upper rotational speed limit $N_2$ within a range of relatively small accelerator opening degrees in which a cylinder cut-off operation or the like is performed. Therefore, a region in which a cylinder cut-off operation or the like is performed may be secured while a reduction in the reliability of the centrifugal pendulum damper 13 due to high speed rotation is prevented and, as a result, the fuel efficiency of the engine may be increased.

With the above-described configuration, according to the present embodiment, the engagement degree of the clutch mechanism 14 is controlled by the connection/disconnection control module 130 such that the centrifugal pendulum damper 13 rotates at or below the predetermined upper rotational speed limit $N_2$, and by setting the predetermined upper rotational speed limit $N_2$ to be a rotational speed at a rate at which a reduction in reliability does not occur during rotation of the centrifugal pendulum damper 13, a reduction in reliability of the centrifugal pendulum damper 13 due to high speed rotation may be avoided.

Further, according to the present embodiment, because the input shaft 3 and the centrifugal pendulum damper 13 are operatively coupled via the planetary gear set 12, the rotational speed of the centrifugal pendulum damper 13 is increased in relation to the input shaft 3*b*, and even if the rotational radius and weight of pendulum of the centrifugal pendulum damper 13 are reduced, the centrifugal force acting upon the pendulum may be secured. Therefore, the centrifugal pendulum damper 13 may the reduced in size while sufficiently exhibiting vibration suppression effects.

Further, according to the second modification example of the present embodiment, the predetermined upper rotational speed limit is set according to the load of the engine 1. Therefore, by, for example, reducing the predetermined upper rotational speed limit $N_2$ within a relatively large range of power source loads in which torque fluctuations are not easily generated, a reduction in the reliability of the centrifugal pendulum damper 13 due to high speed rotation can be avoided while securing a region of the engaged state in which a cylinder cut-off operation or the like can be performed, and, as a result, the fuel efficiency of the engine may be increased.

Further, according to the present embodiment, when the rotational speed of the centrifugal pendulum damper 13 increases to the predetermined upper rotational speed limit $N_2$, the connection/disconnection control module 130 controls the engagement degree of the clutch mechanism 14 to the released side in order to cause the rotational speed of the centrifugal pendulum damper 13 to be at or below the predetermined upper rotational speed limit $N_2$, and therefore the clutch mechanism 14 may be maintained in the engaged state until the rotational speed of the centrifugal pendulum damper 13 reaches the predetermined upper rotational speed limit $N_2$, and the vibration-suppressing effects of the centrifugal pendulum damper 13 may be obtained in as wide an engine rotation region as possible. Therefore, an operation region of the engine 1 wherein a cylinder cut-off operation or the like is possible may be secured widely while avoiding a reduction in the reliability of the centrifugal pendulum damper due to high speed rotation.

Further, according to the present embodiment, when the rotational speed of the centrifugal pendulum damper 13 rises to the predetermined upper rotational speed limit $N_2'$ which is lower than the predetermined upper rotational speed limit $N_2$, the connection/disconnection control module 130 controls the engagement degree of the clutch mechanism 14 to the released side, and therefore, the engine rotational speed may be prevented from exceeding the predetermined upper rotational speed limit $N_2$ even if a time delay occurs before the clutch mechanism is actually switched to the released state, and thus, a reduction in the reliability of the centrifugal pendulum damper due to high speed rotation can be more surely be avoided.

In addition, according to the present embodiment, the control of the clutch mechanism 14 to the release side by the connection/disconnection control module 130 includes the control for releasing the clutch mechanism 14 and the control for slipping the clutch mechanism 14, and therefore, by gradually decreasing the engagement degree of the clutch mechanism 14, the clutch mechanism 14 can be smoothly switched from the engaged state to the released state via the slip state. And therefore, generation of shock due to a rapid change in the engagement degree can be suppressed.

The present invention is not limited by the illustrated embodiment, and various enhancements and design modifications may be made within a range that does not deviate from the scope of the present invention.

For example, an embodiment obtained by an appropriate combination of differing technical processor disclosed in each of the embodiment or modification examples is included within the technical scope of the present invention.

Further, although the present embodiment describes an example of using the frictionally-engaged type clutch mechanism 14 operated by hydraulic pressure as the connection/disconnection mechanism, the connection/disconnection mechanism is not limited to such. For example, a solenoid-operated electromagnetic friction clutch may alternatively be used.

Further, although the present embodiment describes an example of using the clutch mechanism 14 as the connection/disconnection mechanism, the connection/disconnection mechanism is not limited to such. For example, a brake mechanism may alternatively be disposed between the ring gear 23 of the planetary gear set 12 and the transmission case **3*d*** as the connection/disconnection mechanism.

Furthermore, although the present embodiment describes an example of using the engine 1, an internal combustion engine, as the power source, the power source is not limited to such. For example, a so-called hybrid engine may alternatively be used wherein the hybrid engine is configured such that a power generator is attached to the engine is used as a motor to assist the engine during acceleration while also generating power.

As described above, a reduction in the reliability of the centrifugal pendulum damper due to high speed rotation can be avoided according to the present invention which may therefore be suitably used in a manufacturing technology field of control devices of powertrains with this type of centrifugal pendulum damper or of vehicles mounted therewith.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine (power source)
**3*b*** Input shaft (power transmission shaft)
10 Powertrain
12 Planetary gear set (speed increasing mechanism)
13 Centrifugal pendulum damper
14 Clutch mechanism (connection/disconnection mechanism)
100 Control unit (control device)
120 Gear shift control module
130 Connection/disconnection control module

The invention claimed is:

1. A control device for a powertrain with a centrifugal pendulum damper, the centrifugal pendulum damper and a power transmission shaft being operatively coupled via a connection/disconnection mechanism, the control device comprising:

a connection/disconnection control module operatively coupled to the connection/disconnection mechanism and configured to control an engagement degree of the connection/disconnection mechanism, wherein the connection/disconnection control module controls the engagement degree of the connection/disconnection mechanism such that the centrifugal pendulum damper rotates at or below a first predetermined upper rotational speed limit.

2. The control device of claim 1, wherein the power transmission shaft and the centrifugal pendulum damper are operatively coupled via a speed increasing mechanism.

3. The control device of claim 2, wherein the first predetermined upper rotational speed limit is set according to a load of a power source.

4. The control device of claim 3, wherein when a rotational speed of the centrifugal pendulum damper has increased to the first predetermined upper rotational speed limit, the connection/disconnection control module controls the engagement degree of the connection/disconnection mechanism to a released side to cause the rotational speed of the centrifugal pendulum damper to be at or below the first predetermined upper rotational speed limit.

5. The control device of claim 4, wherein a control of the connection/disconnection mechanism to the released side by the connection/disconnection control module includes a control for releasing the connection/disconnection mechanism, and a control for slipping the connection/disconnection mechanism.

6. The control device of claim 2, wherein when a rotational speed of the centrifugal pendulum damper has increased to the first predetermined upper rotational speed limit, the connection/disconnection control module controls the engagement degree of the connection/disconnection mechanism to a released side to cause the rotational speed of the centrifugal pendulum damper to be at or below the first predetermined upper rotational speed limit.

7. The control device of claim 6, wherein a control of the connection/disconnection mechanism to the released side by the connection/disconnection control module includes a control for releasing the connection/disconnection mechanism, and a control for slipping the connection/disconnection mechanism.

8. The control device of claim 2, wherein when a rotational speed of the centrifugal pendulum damper has increased to a second predetermined upper rotational speed limit which is lower than the first predetermined upper rotational speed limit, the connection/disconnection control module controls the engagement degree of the connection/disconnection mechanism to a released side.

9. The control device of claim 8, wherein a control of the connection/disconnection mechanism to the released side by the connection/disconnection control module includes a control for releasing the connection/disconnection mechanism, and a control for slipping the connection/disconnection mechanism.

10. The control device of claim 3, wherein when a rotational speed of the centrifugal pendulum damper has increased to a second predetermined upper rotational speed limit which is lower than the first predetermined upper rotational speed limit, the connection/disconnection control module controls the engagement degree of the connection/disconnection mechanism to a released side.

11. The control device of claim 10, wherein a control of the connection/disconnection mechanism to the released side by the connection/disconnection control module includes a control for releasing the connection/disconnection mechanism, and a control for slipping the connection/disconnection mechanism.

12. The control device of claim 1, wherein the first predetermined upper rotational speed limit is set according to a load of a power source.

13. The control device of claim 12, wherein when a rotational speed of the centrifugal pendulum damper has increased to the first predetermined upper rotational speed limit, the connection/disconnection control module controls the engagement degree of the connection/disconnection mechanism to a released side to cause the rotational speed of the centrifugal pendulum damper to be at or below the first predetermined upper rotational speed limit.

14. The control device of claim 13, wherein a control of the connection/disconnection mechanism to the released side by the connection/disconnection control module includes a control for releasing the connection/disconnection mechanism, and a control for slipping the connection/disconnection mechanism.

15. The control device of claim 12, wherein when a rotational speed of the centrifugal pendulum damper has increased to a second predetermined upper rotational speed limit which is lower than the first predetermined upper rotational speed limit, the connection/disconnection control module controls the engagement degree of the connection/disconnection mechanism to a released side.

16. The control device of claim 15, wherein a control of the connection/disconnection mechanism to the released side by the connection/disconnection control module includes a control for releasing the connection/disconnection mechanism, and a control for slipping the connection/disconnection mechanism.

17. The control device of claim 1, wherein when a rotational speed of the centrifugal pendulum damper has increased to the first predetermined upper rotational speed limit, the connection/disconnection control module controls the engagement degree of the connection/disconnection mechanism to a released side to cause the rotational speed of the centrifugal pendulum damper to be at or below the first predetermined upper rotational speed limit.

18. The control device of claim 17, wherein a control of the connection/disconnection mechanism to the released side by the connection/disconnection control module includes a control for releasing the connection/disconnection mechanism, and a control for slipping the connection/disconnection mechanism.

19. The control device of claim 1, wherein when a rotational speed of the centrifugal pendulum damper has increased to a second predetermined upper rotational speed limit which is lower than the first predetermined upper rotational speed limit, the connection/disconnection control module controls the engagement degree of the connection/disconnection mechanism to a released side.

20. The control device of claim 19, wherein a control of the connection/disconnection mechanism to the released side by the connection/disconnection control module includes a control for releasing the connection/disconnection mechanism, and a control for slipping the connection/disconnection mechanism.

* * * * *